United States Patent
Yoshioka et al.

(10) Patent No.: US 8,854,534 B2
(45) Date of Patent: Oct. 7, 2014

(54) IMAGE PROCESSING APPARATUS, FOCUS ADJUSTING METHOD, AND CAMERA MODULE

(75) Inventors: You Yoshioka, Taito-Ku (JP); Hiroaki Morino, Katsushika-ku (JP)

(73) Assignee: Kabushiki Kaisha Toshiba, Tokyo (JP)

(*) Notice: Subject to any disclaimer, the term of this patent is extended or adjusted under 35 U.S.C. 154(b) by 100 days.

(21) Appl. No.: 13/588,088

(22) Filed: Aug. 17, 2012

(65) Prior Publication Data

US 2013/0063651 A1    Mar. 14, 2013

(30) Foreign Application Priority Data

Sep. 9, 2011    (JP) .................... 2011-197349

(51) Int. Cl.
- *H04N 5/232* (2006.01)
- *G02B 7/38* (2006.01)
- *G02B 13/00* (2006.01)
- *G03B 13/36* (2006.01)

(52) U.S. Cl.
CPC ........ *H04N 5/23212* (2013.01); *G02B 13/0075* (2013.01); *G02B 7/38* (2013.01); *G03B 13/36* (2013.01)
USPC ........................................ 348/353

(58) Field of Classification Search
CPC ................. H04N 5/23212; G03B 13/36
USPC ........... 348/345–356; 396/79–83, 89–152; 382/255; 250/201.2
See application file for complete search history.

(56) References Cited

U.S. PATENT DOCUMENTS

| 6,700,618 | B1 | 3/2004 | Chubachi |
| 2010/0119113 | A1* | 5/2010 | Kuleschow et al. .......... 382/103 |
| 2011/0063473 | A1* | 3/2011 | Tsunekawa et al. ....... 348/222.1 |
| 2013/0063473 | A1* | 3/2013 | Pelton et al. .................. 345/592 |
| 2013/0250162 | A1* | 9/2013 | Sasaki ........................... 348/345 |

FOREIGN PATENT DOCUMENTS

| JP | 07-177527 | 7/1995 |
| JP | 10-213736 | 8/1998 |
| JP | 2000-147371 A | 5/2000 |
| JP | 2001-148762 | 5/2001 |
| JP | 2007-11199 | 1/2007 |
| JP | 2008-292541 | 12/2008 |
| JP | 2009-3152 A | 1/2009 |

OTHER PUBLICATIONS

Office Action issued Jan. 21, 2014 in Japanese Patent Application No. 2011-197349 (with English language translation).
Office Action issued Jun. 17, 2014 in Japanese Patent Application No. 2011-1 97349 filed Sep. 9, 2011 (with English Translation).

* cited by examiner

*Primary Examiner* — Mekonnen Dagnew
(74) *Attorney, Agent, or Firm* — Oblon, Spivak, McClelland, Maier & Neustadt, L.L.P.

(57) ABSTRACT

According to an embodiment, an image processing apparatus has a focus control unit. The focus control unit retrieves a focusing point by setting a cutback threshold as a first value. The focus control unit executes a driving operation of an image pickup lens depending on a contrast evaluation value in the case in which the cutback threshold is set to be a second value. The second value is smaller than the first value. The focus control unit executes a driving operation of the image pickup lens depending on a contrast evaluation value in the case in which the cutback threshold is changed from the second value to the first value.

18 Claims, 7 Drawing Sheets

IMAGE PROCESSING APPARATUS, FOCUS ADJUSTING METHOD, AND CAMERA MODULE

CROSS-REFERENCE TO RELATED APPLICATIONS

This application is based upon and claims the benefit of priority from Japanese Patent Application No. 2011-197349, filed on Sep. 9, 2011; the entire contents of which are incorporated herein by reference.

FIELD

Embodiments described herein relate generally to an image processing apparatus, a focus adjusting method, and a camera module.

BACKGROUND

As an autofocus (AF) system for a camera module, there is known a contrast AF system, for example. Referring to the contrast AF system, an image pickup lens is driven in such a manner that a contrast is maximized in a target region to be brought into focus in images taken in by means of an image sensor. The conventional contrast AF system takes measures for excluding a contrast component on a low level to evaluate a contrast in order to efficiently take out a contour part to be a contrast component on a high level, for example, when detecting the contrast from an image signal through image pickup. In some cases in which a pattern to be the contrast component on the low level is more predominant as compared with the contour part which can be a feature of the image, the contrast component on the low level is excluded so that an accurate focus operation is hard to perform. If the contrast component on the low level is caused to remain, moreover, there is reduced a detection sensitivity of a focusing point in which the contrast is maximized.

DETAILED DESCRIPTION

In general, according to an embodiment, an image processing apparatus has a contrast calculating unit, a cutback processing unit, a contrast evaluation value calculating unit, and a focus control unit. The contrast calculating unit calculates a contrast for each position in an image picked up through an image pickup lens. A cutback processing unit executes a cutback processing for the contrast. The cutback processing unit causes data having a greater value than a cutback threshold to pass from a data group of the contrast calculated by the contrast calculating unit. The contrast evaluation value calculating unit integrates the contrast passing through the cutback processing unit. The contrast evaluation value calculating unit calculates a contrast evaluation value. The contrast evaluation value is set to be an evaluation index of a clearness of the image. The focus control unit controls a focus operation of the image pickup lens depending on the contrast evaluation value. The focus control unit successively drives the image pickup lens in such a direction that the contrast evaluation value is increased in a moving direction of the image pickup lens for the focus operation. The focus control unit retrieves a focusing point in which the contrast evaluation value is maximized. The focus control unit retrieves the focusing point by setting the cutback threshold as a first value. The focus control unit executes a driving operation of the image pickup lens depending on the contrast evaluation value in the case in which the cutback threshold is set to be a second value. The second value is smaller than the first value. The focus control unit executes a driving operation of the image pickup lens depending on a contrast evaluation value in the case in which the cutback threshold is changed from the second value to the first value.

Exemplary embodiments of an image processing apparatus, a focus adjusting method, and a camera module will be described below in detail with reference to the accompanying drawings. The present invention is not restricted to the following embodiment.

Figure 1:
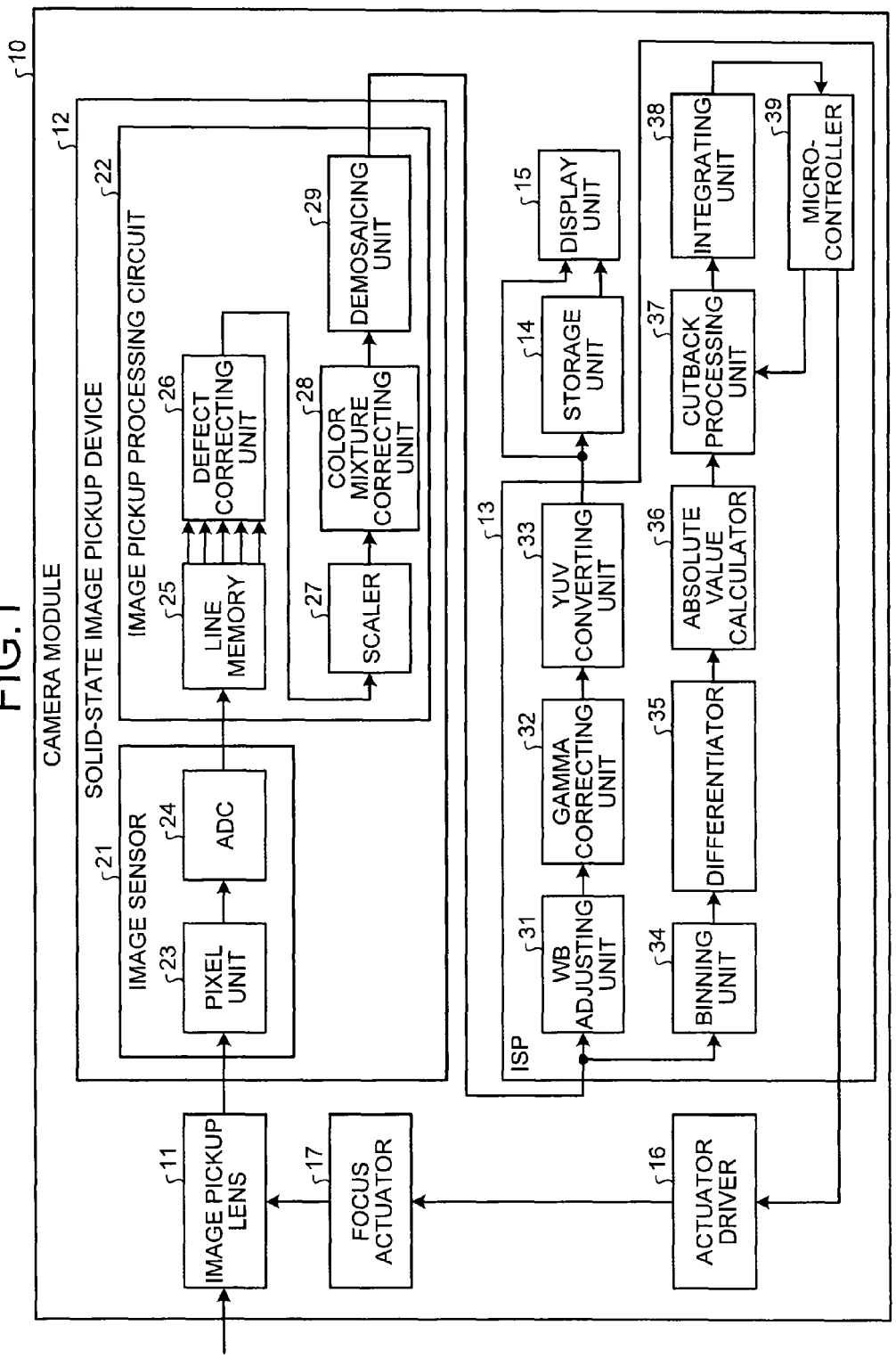
FIG. 1 is a block diagram showing a schematic structure of a camera module according to an embodiment.

FIG. 1 is a block diagram showing a schematic structure of the camera module according to the embodiment. A camera module 10 includes an image pickup lens 11, a solid-state image pickup device 12, an image signal processor (ISP) 13, a storage unit 14, a display unit 15, an actuator driver 16, and a focus actuator 17. The camera module 10 is a digital camera, for example.

The image pickup lens 11 takes in a light from a subject and forms a subject image. The image pickup lens 11 is movable in a direction of an optical axis by means of the focus actuator 17 which will be described below. The solid-state image pickup device 12 picks up the subject image and generates an image signal. The ISP 13 executes a signal processing for the image signal obtained by the image pickup through the solid-state image pickup device 12. The storage unit 14 stores an image subjected to the signal processing in the ISP 13.

The storage unit 14 outputs an image signal to the display unit 15 in response to an operation of a user or the like. The display unit 15 displays an image in response to the image signal input from the ISP 13 or the storage unit 14. The display unit 15 is a liquid crystal display, for example.

The solid-state image pickup device 12 has an image sensor 21 and an image pickup processing circuit 22. The image sensor 21 picks up the subject image formed by the image pickup lens 11. The image sensor 21 has a pixel unit 23 and an analog/digital converter (ADC) 24. The pixel unit 23 converts a light taken in through the image pickup lens 11 into a signal charge. The pixel unit 23 takes in signal values for red (R), green (G), and blue (B) in corresponding order to the Bayer array, thereby generating an analog image signal. The ADC 24 converts the image signal sent from the pixel unit 23 from an analog system to a digital system.

The image pickup processing circuit 22 executes a signal processing for the image signal sent from the ADC 24. The image pickup processing circuit 22 has a line memory 25, a defect correcting unit 26, a scaler 27, a color mixture correcting unit 28, and a demosaicing unit 29.

The line memory 25 temporarily stores an image signal and outputs the image signals for a plurality of lines. The defect correcting unit 26 corrects a defective part (a defect) of a digital image signal due to a pixel which does not function normally through an interpolation of data on a peripheral pixel. The scaler 27 converts a spatial sampling frequency corresponding to a pixel size of an output from the solid-state image pickup device 12. In the case in which the pixel size of the output is set to be an effective pixel number of the image sensor 21, the scaler 27 does not convert the spatial sampling frequency but causes the image signal to pass therethrough.

The color mixture correcting unit 28 subtracts a color mixture component from a signal value for each color component, thereby improving a wavelength separation characteristic for each color. The demosaicing unit 29 generates a signal value of an insufficient color component for each pixel through the interpolation processing for the image signal. The demosaicing unit 29 may compensate for a resolution by adding a high pass component of G to the signal values of R and B together with the interpolation processing, for example.

The ISP 13 has a white balance (WB) adjusting unit 31, a gamma correcting unit 32, a YUV converting unit 33, a binning unit 34, a differentiator 35, an absolute value calculator 36, a cutback processing unit 37, an integrating unit 38, and a microcontroller 39. The WB adjusting unit 31, the gamma correcting unit 32, and the YUV converting unit 33 carry out a processing for the image signal output from the ISP 13. The binning unit 34, the differentiator 35, the absolute value calculator 36, the cutback processing unit 37, the integrating unit 38, and the microcontroller 39 carry out a processing for an AF adjustment with regard to a target region to be brought into focus in an image.

The WB adjusting unit 31 executes a WB adjustment for the image signal sent from the demosaicing unit 29. The ISP 13 can obtain a subject image having a color tone which is as identical as possible with respect to a difference in a color temperature of a light source through the WB adjustment in the WB adjusting unit 31. The gamma correcting unit 32 executes a gamma correction for correcting a gradation of an image with respect to the image signals for R, G, and B. The YUV converting unit 33 generates a luminance (Y) signal and a color difference (UV) signal from the image signals for R, G, and B, thereby converting the image signal from an RGB system to a YUV system (for example, YUV422 or the like). The ISP 13 outputs an image signal subjected to the conversion in the YUV converting unit 33.

The binning unit 34 executes a binning processing for the image signal sent from the demosaicing unit 29. The binning unit 34 averages signal values for a predetermined number of (for example, n) pixels and sets the number of data to be 1/n through the binning processing. The binning unit 34 functions as a low pass filter for a spatial frequency possessed by an original image.

The camera module 10 executes the binning processing, thereby carrying out a contrast evaluation for a more approximate frequency level than a maximum resolution possessed by the image sensor 21. Consequently, the camera module 10 stabilizes a result of the contrast evaluation and can easily decide whether it is in focus or not. The binning unit 34 may execute either a binning processing for a horizontal or vertical direction in which a pixel is arranged, for example, a binning processing for the horizontal direction or a binning processing for the horizontal and vertical directions.

The differentiator 35 differentiates a signal value through a finite impulse response (FIR) filter for the horizontal direction of the image subjected to the binning processing and extracts a contour signal of the image. The absolute value calculator 36 obtains an absolute value of the contour signal sent from the differentiator 35, thereby converting the contour signal having positive and negative amplitudes into a signal having a positive amplitude. A signal obtained by the conversion in the absolute value calculator 36 represents a contrast for each position in the image subjected to the binning processing. The differentiator 35 and the absolute value calculator 36 constitute a contrast calculating unit for calculating a contrast for each position in the image.

The cutback processing unit 37 causes data having a greater value than a cutback threshold to pass from a data group for the contrast output from the absolute value calculator 36, thereby executing a cutback processing for the contrast. The integrating unit 38 integrates the contrast passing through the cutback processing unit 37. The integrating unit 38 obtains an average of the contrasts based on a result of the integration of the contrast and outputs the average as a contrast evaluation value. The integrating unit 38 functions as a contrast evaluation value calculating unit for calculating the contrast evaluation value. The contrast evaluation value is set to be an evaluation index for the clearness of an image.

The microcontroller 39 controls the actuator driver 16 depending on the contrast evaluation value. The actuator driver 16 drives the focus actuator 17 depending on a control carried out by the microcontroller 39.

The microcontroller 39 sets the cutback threshold. The microcontroller 39 gives a notice of the cutback threshold to the cutback processing unit 37.

The focus actuator 17 moves the image pickup lens 11 depending on an input current to be controlled by the actuator driver 16. The image pickup lens 11 is moved by setting a direction along an optical axis to be a moving direction, thereby adjusting a focus position. The microcontroller 39 functions as a focus control unit for controlling the focus operation of the image pickup lens 11 depending on the contrast evaluation value.

The focus actuator 17 may employ any structure to be used generally, for example, a voice coil motor system, a piezo-motor system, a DC motor system, a stepping motor system and the like. The voice coil motor system sets an electromagnetic force as a driving force. The piezo-motor system converts a driving force generated by a vibration of a piezoelectric element into a translatory movement by a frictional contact. The DC motor system converts a driving force of a motor rotated with a direct current into a translatory movement by means of a gear or the like. The stepping motor system converts a driving force of a motor rotated synchronously with a pulse power into a translatory movement by means of a gear or the like.

A structure for the signal processing in the camera module 10 is roughly divided into the image pickup processing circuit 22 in a first stage and the ISP 13 in a second stage. The image pickup processing circuit 22 and the ISP 13 function as an image processing apparatus for executing the signal processing for the image picked up by the image sensor 21. The structures of the image pickup processing circuit 22 and the ISP 13 described in the present embodiment are only illustrative and may be changed properly. Referring to the image pickup processing circuit 22 and the ISP 13, for example, it is also possible to carry out an addition of elements other than the elements described in the present embodiment or a change such as an omission of elements which can be omitted.

It is assumed that elements provided in the image pickup processing circuit 22 and elements provided in the ISP 13 in the present embodiment are preferably included in at least one of the image pickup processing circuit 22 and the ISP 13. The elements to be included in the ISP 13 in the present embodiment may be provided in the image pickup processing circuit 22 in place of the ISP 13. Moreover, the elements to be included in the image pickup processing circuit 22 in the present embodiment may be provided in the ISP 13 in place of the image pickup processing circuit 22.

For example, the ISP 13 may evaluate a brightness for a target region to be brought into focus and may add a result of the evaluation to the contrast calculated by the differentiator 35 and the absolute value calculator 36. Consequently, the camera module 10 can reduce an influence, on the contrast evaluation, of a difference in the brightness of the target region to be brought into focus.

Next, description will be given to control of a focus operation which is to be carried out by the microcontroller 39. The microcontroller 39 successively drives the image pickup lens 11 in any of moving directions of the image pickup lens 11 in which the contrast evaluation value is increased, thereby retrieving a focusing point in which the contrast evaluation value is maximized. The microcontroller 39 controls a serial focus operation for causing the image pickup lens 11 to carry out a rocking motion (wobbling) in order to retrieve the focusing point and stopping the image pickup lens 11 in a position in which the focusing point is detected. The technique for the focus operation is generally referred to as a hill-climbing AF system.

Figure 2:
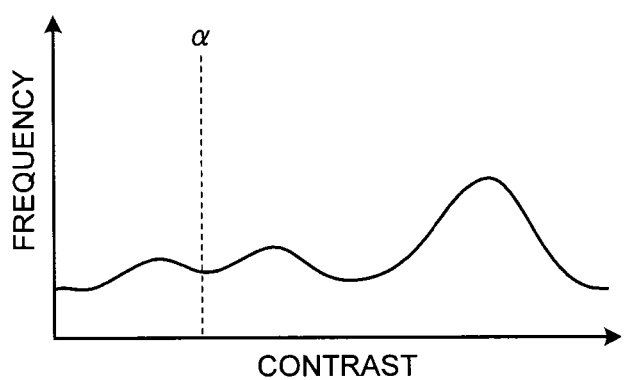
FIG. 2 is a chart representing an example of a histogram of a contrast in the case of in-focus.
Figure 3:
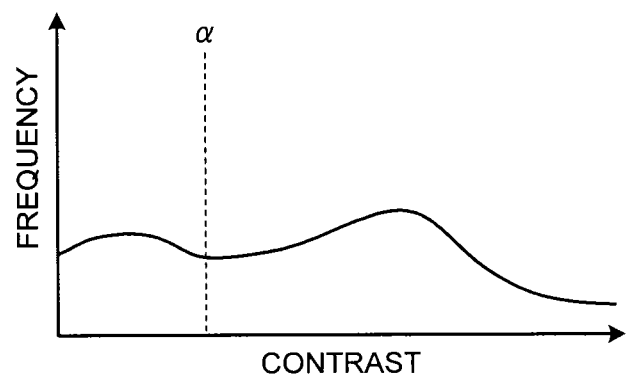
FIG. 3 is a chart representing an example of the histogram of the contrast in the case of out-of-focus in the state shown in FIG. 2.

FIG. 2 is a chart representing an example of a histogram of a contrast in the case of in-focus. FIG. 3 is a chart representing an example of the histogram of the contrast in the case of out-of-focus in the state shown in FIG. 2. In FIGS. 2 and 3, an axis of abscissa indicates a contrast output from the absolute value calculator 36. An axis of ordinate indicates a frequency in a target region to be brought into focus.

The contrast is wholly higher in the case of in-focus than in the case of out-of-focus. A peak of the contrast which is obtained by a contour component of a subject image is shifted toward a low contrast side due to the out-of-focus. It is assumed that the cutback threshold is set to be α for the data group of the contrast shown in FIGS. 2 and 3, for example. In this case, the contrast evaluation value is obtained by averaging data on a greater value than α in the data group of the contrast.

Figure 4:
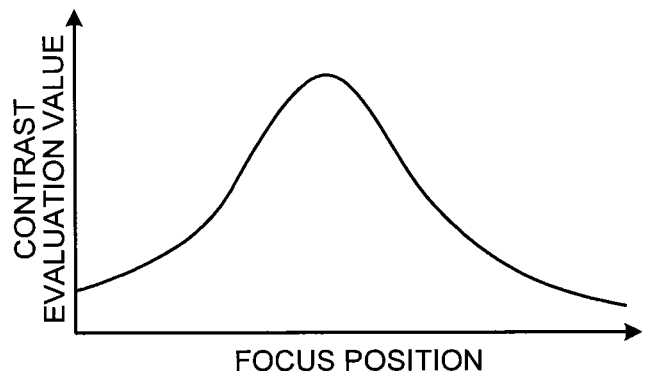
FIG. 4 is a chart representing an example of a change in a contrast evaluation value in the case in which a focus position is scanned from a close position to a distant position.

FIG. 4 is a chart representing an example of a change in the contrast evaluation value in the case in which a focus position is scanned from a close position to a distant part. In the drawing, an axis of abscissa indicates a focus position and represents that a rightward direction corresponds to a more distant part. An axis of ordinate indicates a contrast evaluation value. The contrast evaluation value is maximized when the focus position reaches a focusing point. The contrast evaluation value is gradually reduced from a maximum value when the focus position is placed apart from the focusing point.

When the focus position and the contrast evaluation value have the relationship shown in FIG. 4, it is possible to detect the focusing point in which the contrast evaluation value is maximized through the repetition of a change in the focus position in such a direction that the contrast evaluation value is increased in the case in which the hill-climbing AF system is applied. By previously executing the cutback processing, moreover, it is possible to cause the peak of the contrast evaluation value to be sharp, thereby detecting the focusing point with a high sensitivity.

Figure 5:
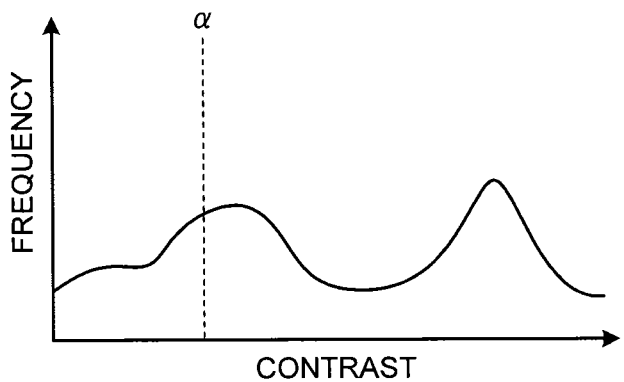
FIG. 5 is a chart representing an example of a histogram of a contrast in the case of in-focus.
Figure 6:
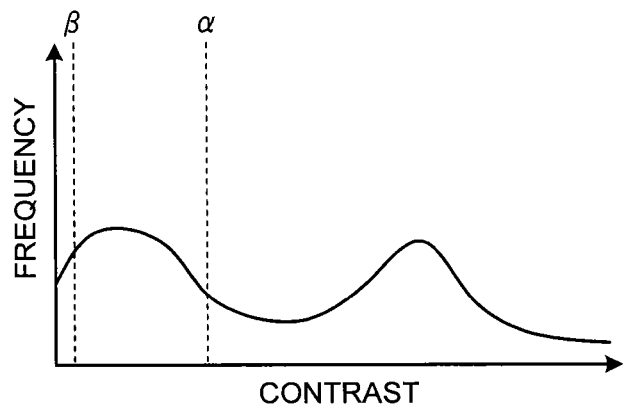
FIG. 6 is a chart representing an example of the histogram of the contrast in the case of out-of-focus in the state shown in FIG. 5.

FIGS. 5 and 6 are charts representing an example of the histogram of the contrast in the case of a different pattern from that in each of FIGS. 2 and 3. FIG. 5 illustrates the case of in-focus. FIG. 6 represents the case of out-of-focus in the state shown in FIG. 5.

According to the histogram shown in FIG. 5, a contrast component on a low level appears remarkably in addition to a contour component to be a contrast component on a high level. An image includes a clear pattern to be the contour component and a pattern which is thin and has an equal cycle. When a subject image is out of focus, both a peak of the contour component and a peak of the contrast component on the low level are shifted toward the low contrast side as shown in FIG. 6.

In the case in which the cutback threshold is set to be α for the histogram shown in FIG. 6, it is assumed that most of the contrast component on the low level is included in a lower range than α. In this case, most of the contrast component on the low level is excluded by the cutback processing so that the calculation of the contrast evaluation value is not reflected. Since the contrast component lower than α is not reflected on the calculation of the contrast evaluation value, the contrast evaluation value to be the average of the data group on the contrast might represent a higher value than a value to be originally taken irrespective of the out-of-focus in some cases.

Figure 7:
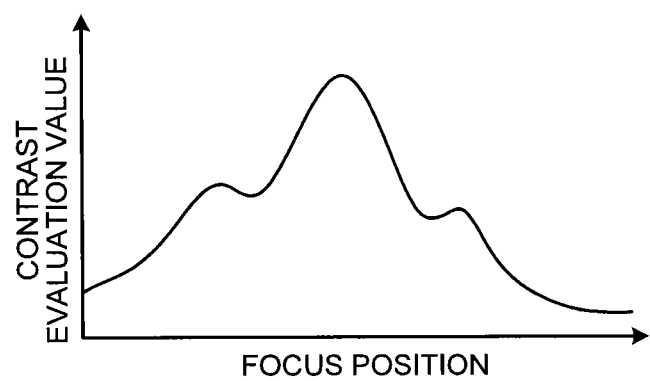
FIG. 7 is a chart representing an example of a change in a contrast evaluation value in the case in which a cutback threshold is represented by a for a data group of the contrast shown in FIGS. 5 and 6.

FIG. 7 is a chart representing an example of a change in the contrast evaluation value in the case in which the cutback threshold is set to be α for the data group of the contrast shown in FIGS. 5 and 6. The contrast evaluation value is maximized when the focus position reaches the focusing point. When the focus position is gradually separated from the focusing point, the contrast evaluation value is reduced to some degree and is then increased once. In a peak appearing irrespective of a difference between the focus position and the focusing point (which will be hereinafter referred to as a "local peak" appropriately), the contrast evaluation value takes a great value irrespective of the out-of-focus as described with reference to FIG. 6.

The local peak appears when the focus position is placed between the image pickup lens 11 and the focusing point and when the focus position is more distant than the focusing point. In this case, if it is assumed that the retrieval is started in a position placed further distantly from the local peak, that is, a bottom part of a graph shown in FIG. 7, the retrieval through the hill-climbing AF system converges in the local peak. Thus, the retrieval is ended through the convergence in the local peak before the focusing point is detected. For this reason, the focus operation is incomplete. If the cutback processing is stopped uniformly or the cutback threshold is simply set to be a small value, the local peak can be suppressed, while the peak of the contrast evaluation value is lowered to be gentle so that the detection sensitivity of the focusing point is reduced.

The microcontroller 39 according to the present embodiment changes the cutback threshold into β (a second value) which is smaller than α as shown in FIG. 6 in succession to the retrieval of the focusing point in which the cutback threshold is set to be α (a first value). In the case in which the cutback threshold is set to be β, it is assumed that most of the contrast component on the low level is included in a higher range than β. In this case, most of the component to be excluded when the cutback threshold is set to be α can be left so that the calculation of the contrast evaluation value can be reflected.

Figure 8:
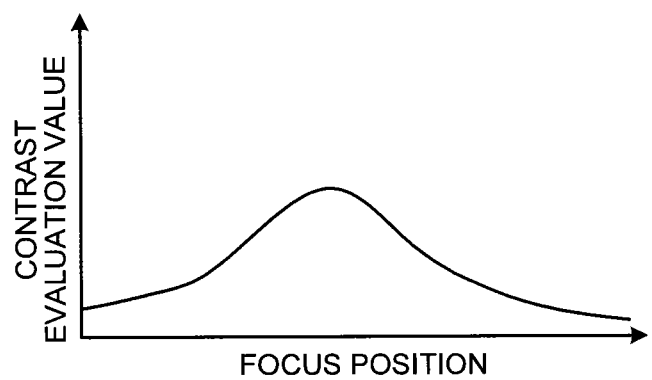
FIG. 8 is a chart representing an example of the change in the contrast evaluation value in the case in which the cutback threshold is represented by β for the data group of the contrast shown in FIGS. 5 and 6.

FIG. 8 is a chart representing an example of the change in the contrast evaluation value in the case in which the cutback threshold is set to be β for the data group of the contrast shown in FIGS. 5 and 6. By setting the cutback threshold to be β which is smaller than α, the contrast evaluation value in the case in which the focus position reaches the focusing point is smaller than that in the case shown in FIG. 7. On the other hand, a higher contrast component than β is reflected on the calculation of the contrast evaluation value so that the local peak can be removed. By removing the local peak, the microcontroller 39 can detect the focusing point by the retrieval through the hill-climbing AF system.

Figure 9:
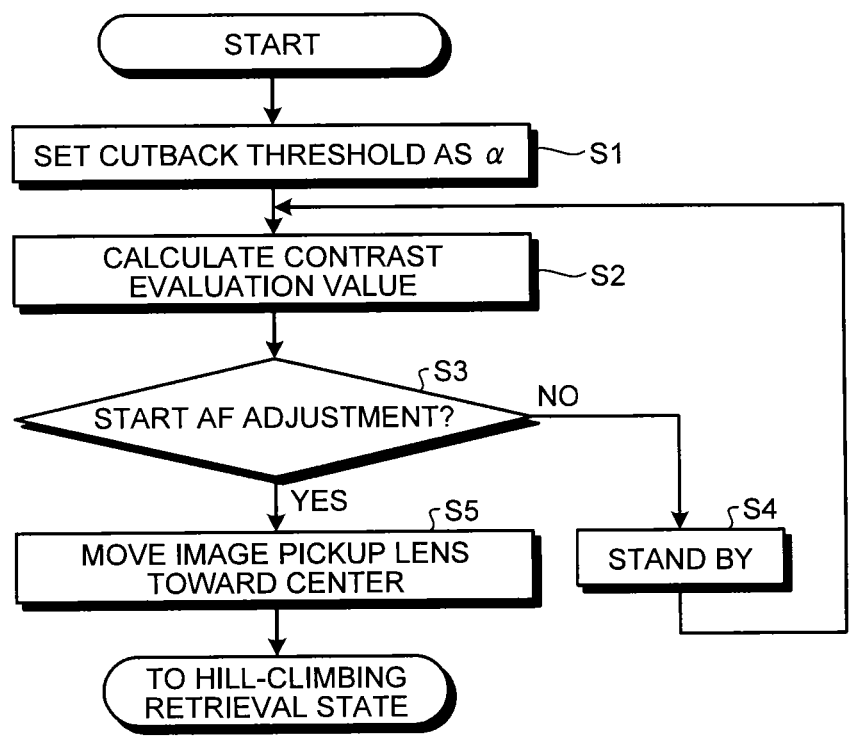
FIGS. 9, 10, and 11 are flow charts showing a procedure for a focus operation.
Figure 10:
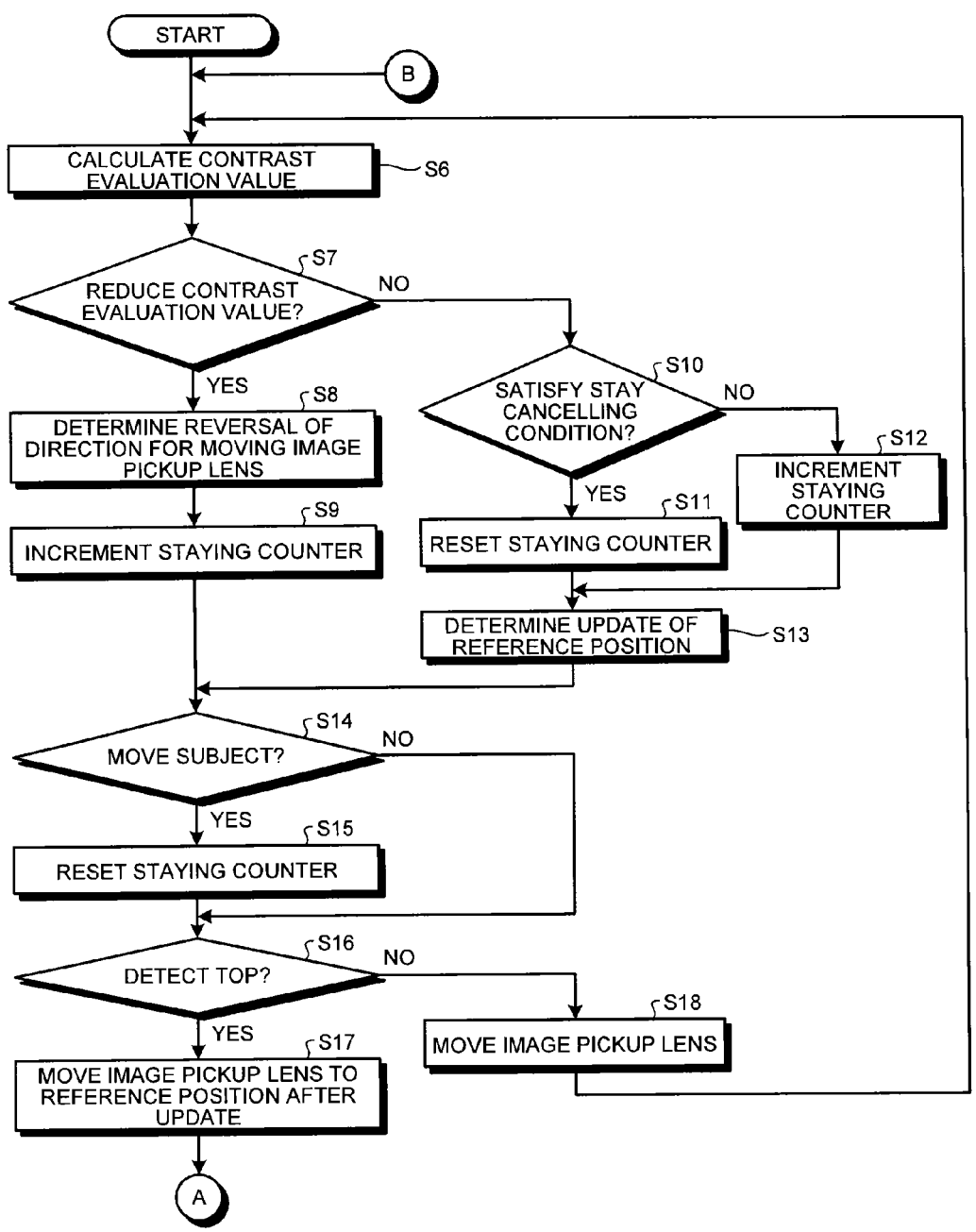
Figure 11:
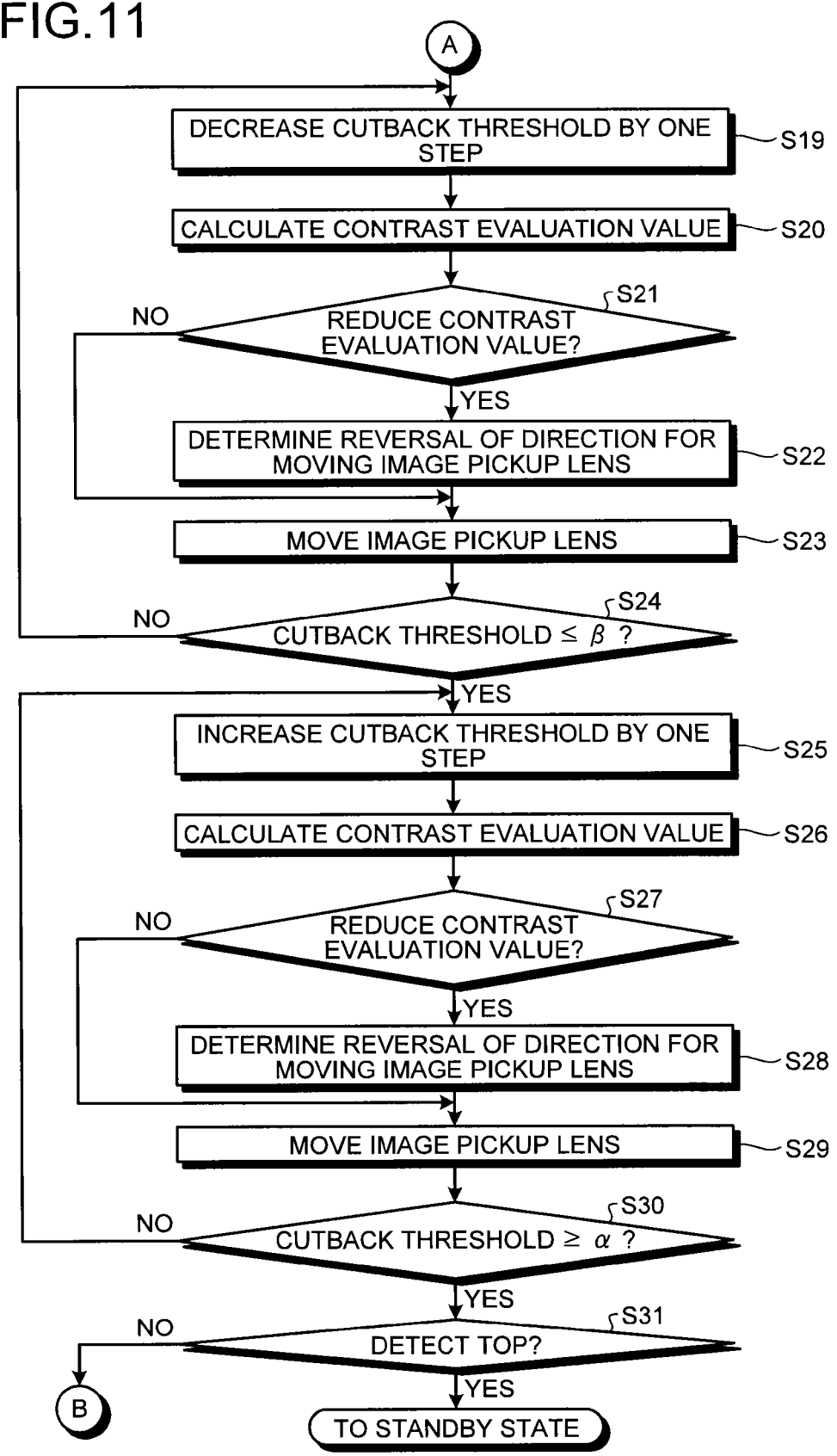

FIGS. 9 to 11 are flow charts showing a procedure for the focus operation. The focus operation is roughly divided into a standby state shown in FIG. 9 and a hill-climbing retrieval state shown in FIGS. 10 and 11. The hill-climbing retrieval state includes a retrieving stage for retrieving the focusing point and a verifying stage for verifying an arrival at the focusing point.

The standby state indicates a status in which a standby is made while deciding whether the retrieval of the focusing point is started or not. The position of the image pickup lens 11 at the start of the standby state is set to be a reference position at that time.

When the standby state is started, the microcontroller 39 sets the cutback threshold into a to be the first value (Step S1) and gives a notice to the cutback processing unit 37. α is set to be a value which is equal to a general cutback threshold in the hill-climbing AF system. The integrating unit 38 calculates the contrast evaluation value based on data on a contrast subjected to the cutback processing in the cutback processing unit 37 (Step S2).

Next, the microcontroller 39 decides whether the AF adjustment is started or not (Step S3). The microcontroller 39 decides that the AF adjustment is started if the contrast evaluation value is changed beyond a preset range, for example. In addition, the microcontroller 39 may decide the start of the AF adjustment if the number of times that the continuation of the standby is decided at the Step S3 is equal to or greater than a preset number of times or if the standby state passes a predetermined time.

If it is decided that the AF adjustment is not started (Step S3, No), the microcontroller 39 stands by (Step S4) until it subsequently calculates a contrast evaluation value in order to decide the start of the AF adjustment (Step S2).

If it is decided that the AF adjustment is started (Step S3, Yes), the microcontroller 39 moves the image pickup lens 11 from a reference position toward a central position within the moving range of the image pickup lens 11 (Step S5). The microcontroller 39 transfers the focus operation to the hill-climbing retrieval state by the movement of the image pickup lens 11 at the Step S5. It is assumed that a distance at which the image pickup lens 11 is to be moved at the Step S5 is preset for the hill-climbing retrieval.

The microcontroller 39 retrieves the focusing point through the successive driving operation of the image pickup lens 11 from Step S6 to Step S18 which are the retrieving stages.

When the hill-climbing retrieval state is started, the integrating unit 38 calculates the contrast evaluation value after the movement through the Step S5 (Step S6). The microcontroller 39 decides whether the contrast evaluation value calculated at the Step S6 is reduced or not with regard to the contrast evaluation value calculated at the Step S2 (Step S7).

If it is decided that the contrast evaluation value is reduced (Step S7, Yes), the microcontroller 39 determines that a direction for subsequently moving the image pickup lens 11 is to be reversed (Step S8). In the case in which the direction for moving the image pickup lens 11 is reversed, the image pickup lens 11 stays in a position before a last movement. The microcontroller 39 increments a staying counter (not shown) through the determination of the Step S8 (Step S9). The staying counter counts the number of times that the image pickup lens 11 continuously stays and holds the number of times.

Moreover, the microcontroller 39 counts, as a stay cancelling condition, the number of times that the image pickup lens 11 is continuously moved in a certain direction. The microcontroller 39 decides that the stay is cancelled when the number of times for the continuous movement reaches a predetermined threshold. The microcontroller 39 decides that the stay is continuously carried out if the number of times for the continuous movement does not reach the predetermined threshold.

If it is decided that the contrast evaluation value is not reduced (Step S7, No), the microcontroller 39 refers to the number of times for the continuous movement, thereby deciding whether the stay cancelling condition is satisfied or not (Step S10).

If it is decided that the stay cancelling condition is satisfied (Step S10, Yes), the microcontroller 39 resets the staying counter (Step S11). If it is decided that the stay cancelling condition is not satisfied (Step S10, No), the microcontroller 39 increments the staying counter (Step S12). After the Step S11 or the Step S12, the microcontroller 39 determines that the reference position is to be updated to a current position of the image pickup lens 11 (Step S13).

Next, the microcontroller 39 decides whether the subject is moved or not (Step S14). The microcontroller 39 decides whether the subject is moved or not based on a change in a histogram of a contrast, a change in a brightness of an image, a variation in a contrast evaluation value or the like, for example. If it is decided that the subject is moved (Step S14, Yes), the microcontroller 39 resets the staying counter (Step S15). Consequently, the microcontroller 39 manages the hill-climbing retrieval again if the subject is moved.

If it is decided that the subject is not moved (Step S14, No) or after the Step S15, the microcontroller 39 decides whether a top in which the contrast evaluation value is maximized is detected or not (Step S16). The microcontroller 39 detects whether the image pickup lens 11 stays in a certain position or not depending on the count of the staying counter, that is, the number of times that the reversal of the direction for moving the image pickup lens 11 is repeated. The microcontroller 39 assumes that the image pickup lens 11 stays and decides that the top in a transition of the contrast evaluation value is detected based on the fact that the count of the staying counter reaches a predetermined numeric value.

If it is decided that the top is detected (Step S16, Yes) and the update of the reference position is determined at the Step S13, the microcontroller 39 moves the image pickup lens 11 to the reference position after the update (Step S17). If it is decided that the top is detected (Step S16, Yes) and the update of the reference position at the Step S13 is not determined, the microcontroller 39 maintains the position of the image pickup lens 11 to be a previous reference position. If the top is detected at the Step S16, the microcontroller 39 makes a transition to a verifying stage after Step S19 which will be described below.

On the other hand, if it is decided that the top is not detected (Step S16, No), the microcontroller 39 moves the image pickup lens 11 (Step S18). If the reversal of the direction for moving the image pickup lens 11 is determined at the Step S8, the microcontroller 39 moves the image pickup lens 11 in a reverse direction to the last movement.

If the reversal at the step S8 is not determined, the microcontroller 39 moves the image pickup lens 11 in the same direction as that of the last movement. It is assumed that a distance at which the image pickup lens 11 is to be moved at the Step S18 is preset for the hill-climbing retrieval. The microcontroller 39 repeats the operations from the Step S6 after the Step S18.

The microcontroller 39 verifies whether the focusing point is reached or not by the detection of the top at the Step S16 depending on operations from the Step S19 to Step S31 in the verifying stage. The microcontroller 39 executes the driving operation of the image pickup lens 11 depending on the contrast evaluation value while changing the cutback threshold from α to β stepwise from the Step S19 to the Step S24.

The microcontroller 39 decreases the cutback threshold by one stage from α which is the first value to β which is the second value (Step S19). The microcontroller 39 gives the cutback processing unit 37 a notice of a cutback threshold obtained by a decrease of one stage.

β is a smaller value than α and is preferably a value on a higher level than a signal noise. Moreover, it is assumed that β is a value on a lower level than a contrast component on a low level which is supposed to be included in an image at a high frequency. By setting β to be as small as possible, the microcontroller 39 can effectively suppress the local peak.

It is assumed that a reduction range in which the cutback threshold is to be decreased stepwise by the microcontroller 39 can be set properly. By changing the cutback threshold from α to β stepwise, the microcontroller 39 can lessen the influence of the change in the cutback threshold on the retrieving operation, thereby enabling a stable focus operation.

The integrating unit 38 calculates a contrast evaluation value in the case in which the cutback threshold cut down in the Step S19 is applied (Step S20). The microcontroller 39 decides whether or not the contrast evaluation value calculated at the Step S20 is reduced as compared with the last calculated contrast evaluation value (Step S21).

If it is decided that the contrast evaluation value is reduced (Step S21, Yes), the microcontroller 39 determines that the direction for subsequently moving the image pickup lens 11 is to be reversed to the last direction (Step S22). In the case in which the reversal of the direction for moving the image pickup lens 11 is determined, the microcontroller 39 moves the image pickup lens 11 in a reverse direction to the direction for the last movement of the image pickup lens 11 (Step S23).

If it is decided that the contrast evaluation value is not reduced (Step S21, No), the microcontroller 39 moves the image pickup lens 11 in the same direction as the direction in which the image pickup lens 11 is moved last (Step S23). It is assumed that distances at which the image pickup lens 11 is to be moved in the Step S23 and the Step S29 to be described below is preset for the hill-climbing retrieval.

The microcontroller 39 decides whether the current cutback threshold is equal to or smaller than β (Step S24). If the current cutback threshold is greater than β (Step S24, No), the microcontroller 39 repeats the operations from the Step S19. If the current cutback threshold is equal to or smaller than β (Step S24, Yes), the microcontroller 39 proceeds to a procedure after the Step S25.

The microcontroller 39 executes the driving operation of the image pickup lens 11 depending on the contrast evaluation value while returning the cutback threshold from β to α stepwise at the Step S25 to the Step S30.

The microcontroller 39 increases the cutback threshold by one stage from β toward α (Step S25). The microcontroller 39 gives the cutback processing unit 37 a cutback threshold obtained by the increase of one stage. It is assumed that an increase range for increasing the cutback threshold stepwise can be set properly. The microcontroller 39 changes the cutback threshold from β to α stepwise, thereby lessening the influence of the change in the cutback threshold on the retrieving operation. Thus, the stable focus operation can be carried out.

The integrating unit 38 calculates a contrast evaluation value in the case in which the cutback threshold incremented at the Step S25 is applied (Step S26). The microcontroller 39 decides whether or not the contrast evaluation value calculated at the Step S26 is reduced as compared with the contrast evaluation value calculated last (Step S27).

If it is decided that the contrast evaluation value is reduced (Step S27, Yes), the microcontroller 39 determines that the direction for subsequently moving the image pickup lens 11 is reversed to the previous direction (Step S28). In the case in which the reversal of the direction for moving the image pickup lens 11 is determined, the microcontroller 39 moves the image pickup lens 11 in a reverse direction to the direction for moving the image pickup lens 11 last (Step S29).

If it is decided that the contrast evaluation value is not reduced (Step S27, No), the microcontroller 39 moves the image pickup lens 11 in the same direction as the direction in which the image pickup lens 11 is moved last (Step S29). The microcontroller 39 decides whether the current cutback threshold is equal to or greater than α or not (Step S30). If the current cutback threshold is smaller than α (Step S30, No), the microcontroller 39 repeats the operations from the Step S25.

If the current cutback threshold is equal to or greater than α (Step S30, Yes), the microcontroller 39 decides whether the top is detected or not (Step S31). The microcontroller 39 decides whether a top in a transition of the contrast evaluation value is detected or not based on whether the count of the staying counter reaches a predetermined numeric value or not, that is, whether the reversal of the moving direction for the image pickup lens 11 is repeated or not in the same manner as in the Step S16.

If the microcontroller 39 decides that the top is detected (Step S31, Yes), it is assumed that the focusing point is completely detected and a transfer to the standby state from the Step S1 is carried out. If the microcontroller 39 decides that the top is not detected (Step S31, No), the operations from the Step S6 are repeated.

Also in the case in which the retrieval converges in the local peak with respect to the subject image having the contrast component on the low level appearing remarkably together with the contour component, the microcontroller 39 can continuously carry out the retrieval toward the focusing point by changing the cutback threshold from α to β. Moreover, the microcontroller 39 returns the cutback threshold from β to α, thereby enhancing the detection sensitivity of the focusing point again to enable a detection of the focusing point with high precision. As described above, the image processing apparatus can execute a precise focus operation and detect the focusing point with a high sensitivity.

The microcontroller 39 may prevent at least one of the change of the cutback threshold from α to β and the change of the cutback threshold from β to α from being a stepwise change. The microcontroller 39 may set at least one of the change of the cutback threshold from α to β and the change of the cutback threshold from β to a as a non-stepwise change taking no value between α and β. Also in this case, the microcontroller 39 can obtain an effect that the focusing point can be retrieved accurately with high precision.

It is assumed that the cutback thresholds α and β can be set properly depending on a performance of the image sensor 21, a design of an optical system or the like, for example. The image processing apparatus may set the cutback thresholds α and β to be fixed values, and furthermore, may cause at least one of α and β to be variable. The microcontroller 39 may change at least one of the cutback thresholds α and β depending on a zoom, an analog gain or the like, for example. Consequently, the image processing apparatus can execute the AF adjustment depending on the image pickup condition.

The focus operation described in the present embodiment can easily be implemented by adding the verifying procedure with the change of the cutback threshold to the procedure for the hill-climbing AF system for setting a cutback threshold to be a fixed value. The image processing apparatus is not restricted to the case in which the verifying operation is executed in succession to the retrieval of the focusing point but may change the cutback threshold simultaneously with the retrieval of the focusing point. In this case, the verifying operation is incorporated into the retrieval of the focusing point so that the focusing point can rapidly be retrieved accurately with high precision.

The camera module 10 according to the embodiment may be an electronic apparatus other than a digital camera, for example, a portable telephone having a camera or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a contrast calculating unit configured to calculate a contrast for each position in an image picked up through an image pickup lens;
a cutback processing unit configured to cause data having a greater value than a cutback threshold to pass from a data group of the contrast calculated by the contrast calculating unit, thereby executing a cutback processing for the contrast;
a contrast evaluation value calculating unit configured to calculate a contrast evaluation value to be an evaluation index of a clearness of the image via an integration of the contrast passing through the cutback processing unit; and
a focus control unit configured to control a focus operation of the image pickup lens depending on the contrast evaluation value,
wherein the focus control unit successively drives the image pickup lens in such a direction that the contrast evaluation value is increased in a moving direction of the image pickup lens for the focus operation, thereby retrieving a focusing point in which the contrast evaluation value is maximized, and
the focus control unit retrieves the focusing point by executing a driving operation of the image pickup lens depending on the contrast evaluation value calculated in the case in which the cutback threshold is set to be a second value that is smaller than a first value, as a verification of retrieving the focusing point in the case in which the cutback threshold is set to be the first value, and then, retrieves the focusing point by executing a driving operation of the image pickup lens depending on the contrast evaluation value calculated in the case in which the cutback threshold is changed from the second value to the first value.

2. The image processing apparatus according to claim 1, wherein in the verification, the focus control unit executes the driving operation of the image pickup lens while changing the cutback threshold from the first value to the second value stepwise.

3. The image processing apparatus according to claim 1, wherein in the verification, the focus control unit executes the driving operation of the image pickup lens while changing the cutback threshold from the second value to the first value stepwise.

4. The image processing apparatus according to claim 1, wherein the focus control unit detects whether the image pickup lens stays in a certain position or not depending on the number of times that a reversal of a direction for moving the image pickup lens is repeated.

5. The image processing apparatus according to claim 1, wherein the focus control unit changes the cutback threshold from the first value to the second value in succession to the retrieval of the focusing point in which the cutback threshold is set to be the first value, thereby executing the driving operation of the image pickup lens depending on the contrast evaluation value.

6. The image processing apparatus according to claim 1, further comprising a binning part configured to execute a binning processing for the image, and
the contrast calculating unit calculating the contrast for the image subjected to the binning processing.

7. A focus adjusting method comprising:
calculating a contrast for each position in an image picked up through an image pickup lens;
causing data having a greater value than a cutback threshold to pass from a data group of the contrast, thereby executing a cutback processing for the contrast;
integrating the contrast subjected to the cutback processing;
calculating a contrast evaluation value to be an evaluation index of a clearness of the image based on a result of the integration of the contrast;
controlling a focus operation of the image pickup lens depending on the contrast evaluation value; and
stopping the image pickup lens in a focusing point in which the contrast evaluation value is maximized,
the control of the focus operation including:
a retrieving stage for successively driving the image pickup lens in such a direction that the contrast evaluation value is increased in a moving direction of the image pickup lens for the focus operation, thereby retrieving the focusing point, and
a verifying stage for verifying an arrival at the focusing point by a driving operation of the image pickup lens depending on the contrast evaluation value calculated in the case in which the cutback threshold is set to be a second value that is smaller than a first value, as a verification of retrieving the focusing point in the case in which the cutback threshold is set to be the first value, and then, retrieving the focusing point by executing a driving operation of the image pickup lens depending on the contrast evaluation value calculated in the case in which the cutback threshold is changed from the second value to the first value.

8. The focus adjusting method according to claim 7, wherein in the verifying stage, the image pickup lens is driven while changing the cutback threshold from the first value to the second value stepwise.

9. The focus adjusting method according to claim 7, wherein in the verifying stage, the image pickup lens is driven while changing the cutback threshold from the second value to the first value stepwise.

10. The focus adjusting method according to claim 7, wherein in the verifying stage, it is detected whether the image pickup lens stays in a certain position or not depending on the number of times that a reversal of a direction for moving the image pickup lens is repeated.

11. The focus adjusting method according to claim 7, wherein there is carried out a transfer to the verifying stage for changing the cutback threshold from the first value to the second value in succession to the retrieving stage for setting the cutback threshold as the first value.

12. The focus adjusting method according to claim 7, further comprising executing a binning processing for the image, and
the contrast being calculated for the image subjected to the binning processing.

13. A camera module comprising:
an image pickup lens configured to take in a light from a subject;
an image sensor configured to pick up a subject image formed by the image pickup lens; and
an image processing apparatus configured to execute a signal processing for the image picked up by the image sensor,
the image processing apparatus including:
a contrast calculating unit configured to calculate a contrast for each position in the image;
a cutback processing unit configured to cause data having a greater value than a cutback threshold to pass from a data group of the contrast calculated by the contrast calculating unit, thereby executing a cutback processing for the contrast;
a contrast evaluation value calculating unit configured to calculate a contrast evaluation value to be an evaluation index for a clearness of the image via an integration of the contrast passing through the cutback processing unit; and
a focus control unit configured to control a focus operation of the image pickup lens depending on the contrast evaluation value,
wherein the focus control unit successively drives the image pickup lens in such a direction that the contrast evaluation value is increased in a moving direction of the image pickup lens for the focus operation, thereby retrieving a focusing point in which the contrast evaluation value is maximized, and
the focus control unit retrieves the focusing point by executing a driving operation of the image pickup lens depending on the contrast evaluation value calculated in the case in which the cutback threshold is set to be a second value that is smaller than a first value, as a verification of retrieving the focusing point in the case in which the cutback threshold is set to be the first value, and next, retrieves the focusing point by executing a driving operation of the image pickup lens depending on the contrast evaluation value calculated in the case in which the cutback threshold is changed from the second value to the first value.

14. The camera module according to claim 13, wherein in the verification, the focus control unit executes the driving operation of the image pickup lens while changing the cutback threshold from the first value to the second value stepwise.

15. The camera module according to claim 13, wherein in the verification, the focus control unit executes the driving operation of the image pickup lens while changing the cutback threshold from the second value to the first value stepwise.

16. The camera module according to claim 13, wherein the focus control unit detects whether the image pickup lens stays in a certain position or not depending on the number of times that a reversal of a direction for moving the image pickup lens is repeated.

17. The camera module according to claim 13, wherein the focus control unit changes the cutback threshold from the first value to the second value in succession to the retrieval of the focusing point in which the cutback threshold is set to be the first value, thereby executing the driving operation of the image pickup lens depending on the contrast evaluation value.

18. The camera module according to claim 13, wherein the image processing apparatus further comprises a binning unit configured to execute a binning processing for the image, and
the contrast calculating unit calculates the contrast for the image subjected to the binning processing.

* * * * *